US008593622B1

(12) United States Patent
Streuber et al.

(10) Patent No.: US 8,593,622 B1
(45) Date of Patent: Nov. 26, 2013

(54) SERIALLY ADDRESSED SUB-PUPIL SCREEN FOR IN SITU ELECTRO-OPTICAL SENSOR WAVEFRONT MEASUREMENT

(75) Inventors: Casey T. Streuber, Tucson, AZ (US); Michael P. Easton, Tucson, AZ (US); Kent P. Pflibsen, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/531,131

(22) Filed: Jun. 22, 2012

(51) Int. Cl.
*G01B 9/00* (2006.01)
*G01B 11/02* (2006.01)

(52) U.S. Cl.
USPC .......................................... 356/124; 356/512

(58) Field of Classification Search
USPC .................................. 356/124, 512
See application file for complete search history.

(56) References Cited

U.S. PATENT DOCUMENTS

| | | | | |
|---|---|---|---|---|
| 4,744,658 | A | * | 5/1988 | Holly .............................. 356/491 |
| 5,289,254 | A | | 2/1994 | Braunecker |
| 6,714,307 | B2 | * | 3/2004 | De Groot et al. ............. 356/512 |
| 7,057,737 | B2 | * | 6/2006 | Millerd et al. ................ 356/495 |
| 2003/0011784 | A1 | * | 1/2003 | De Groot et al. ............. 356/512 |
| 2005/0046863 | A1 | * | 3/2005 | Millerd et al. ................ 356/495 |

FOREIGN PATENT DOCUMENTS

| | | |
|---|---|---|
| DE | 102007032576 A1 | 1/2009 |
| FR | 2920536 A1 | 3/2009 |
| WO | 01/02822 A1 | 1/2001 |

OTHER PUBLICATIONS

Barrett et al., "Maximum-likelihood methods in wavefront sensing: stochastic models and likelihood functions," 2007 Optical Society of America: J. Opt. Soc. Am. A/vol. 24, No. 2/Feb. 2007, pp. 391-414.

* cited by examiner

*Primary Examiner* — Roy M Punnoose
(74) *Attorney, Agent, or Firm* — Eric A. Gifford

(57) ABSTRACT

A system and method for wavefront measurement of an EO sensor is performed in-situ using the sensor's EO detector in a manner that disambiguates the local wavefront measurements for different sub-pupils in time and maximizes the dynamic range for measuring the local wavefronts. A single sub-pupil sized optical beam is traced in a spatial pattern over the EO sensor's entrance pupil to serially illuminate a temporal sequence of sub-pupils to form a serially addressed sub-pupil screen. The EO detector and video card capture a video signal for one sub-pupil at a time as the optical beam traces the spatial pattern. The video signal is routed to a computer processor that generates a spatio-temporal mapping of the spatial positions of the sub-pupils in the sub-pupil screen to the temporal positions of frames in the video signal. The computer processor uses the mapping to process the video signal to compute a wavefront estimate spanning the entrance pupil.

20 Claims, 12 Drawing Sheets

ERROR

NO ERROR

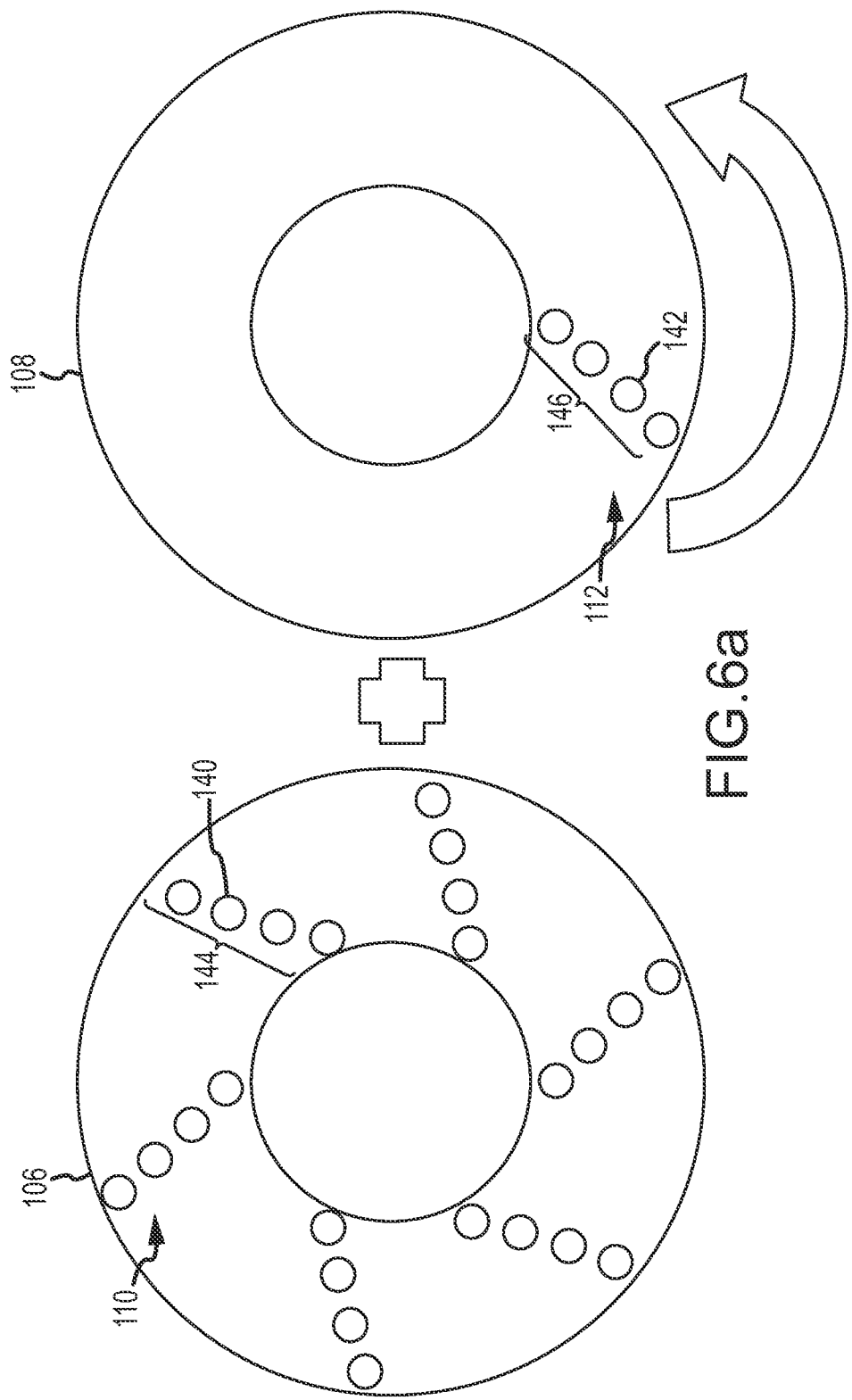

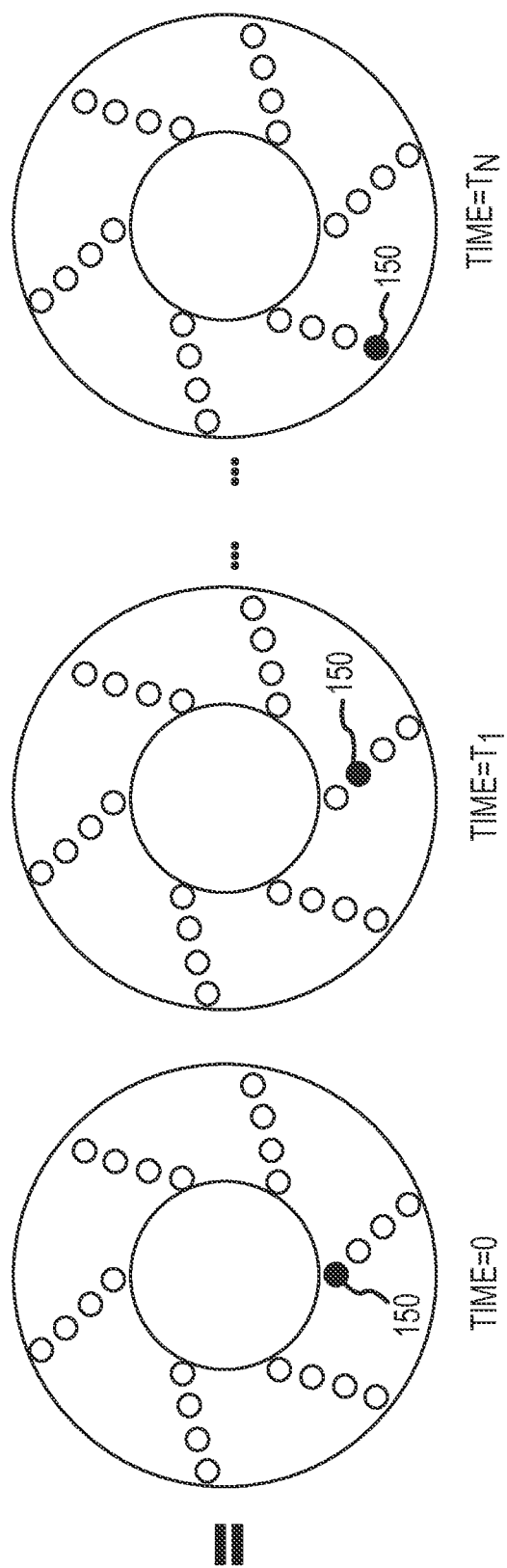

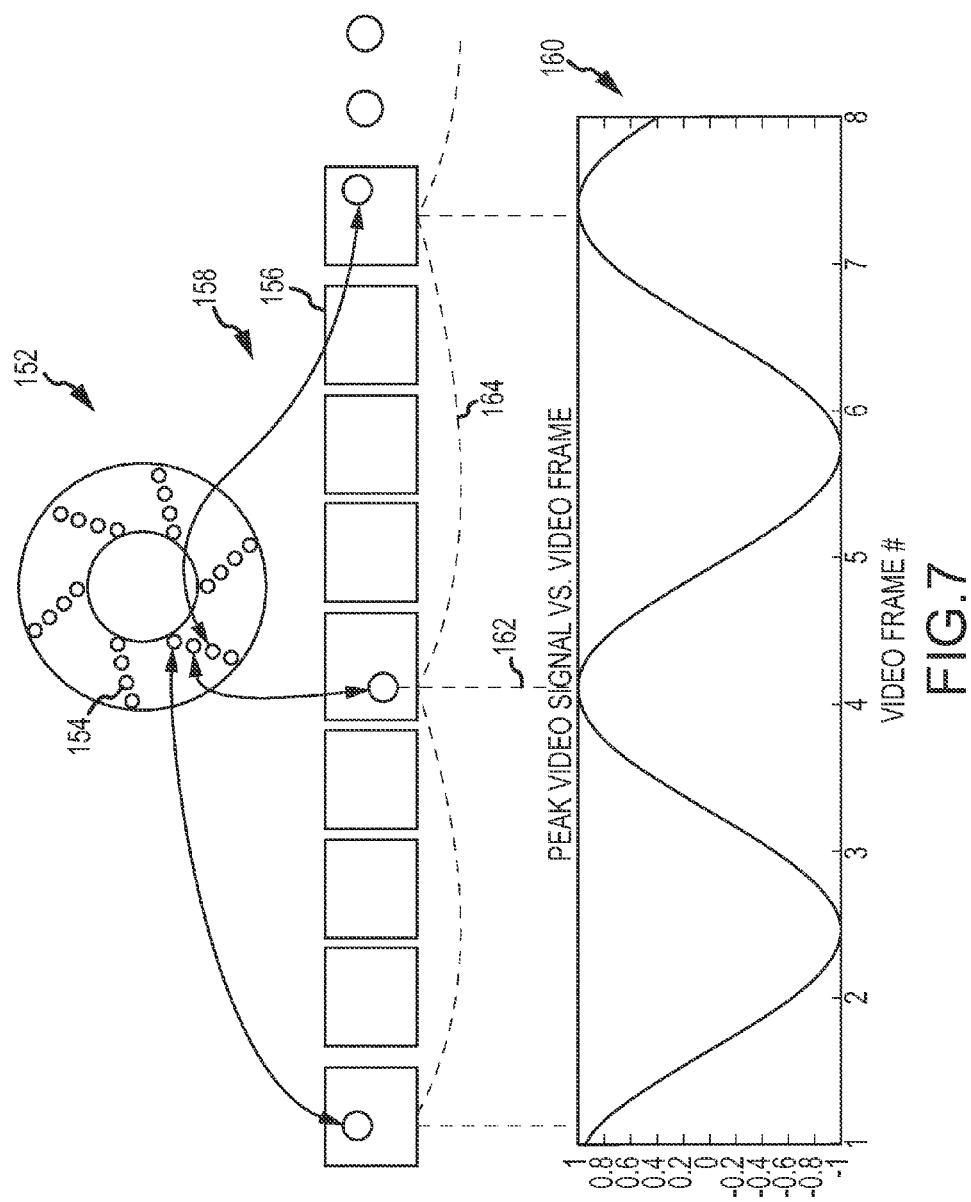

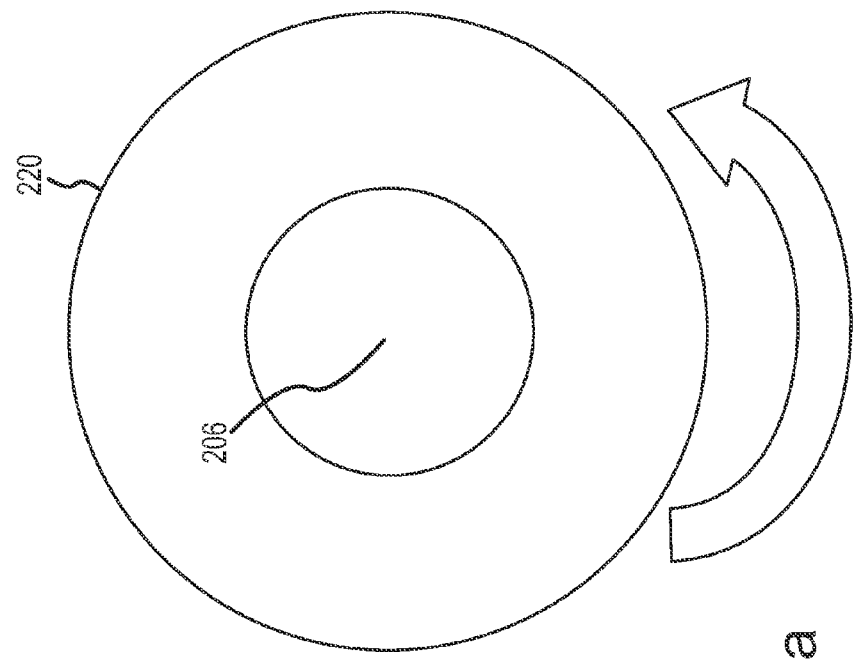
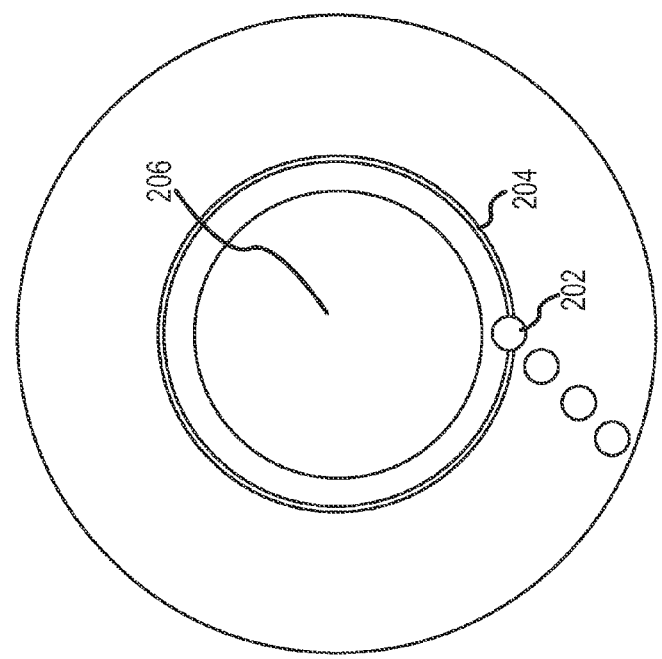
FIG.9a

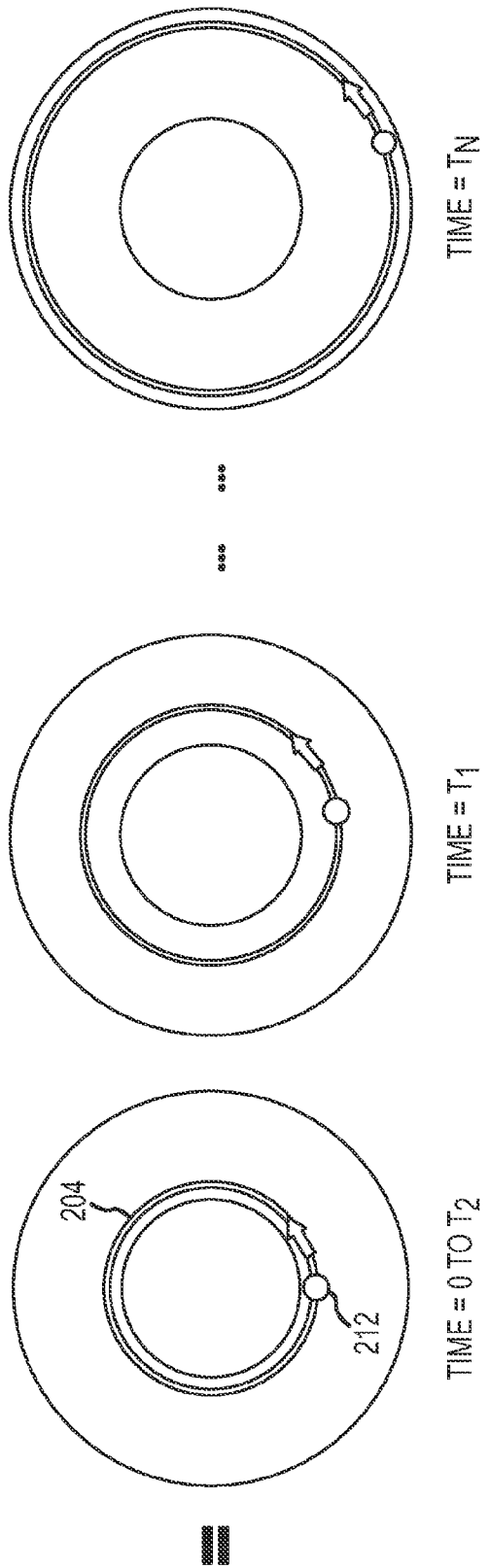

SERIALLY ADDRESSED SUB-PUPIL SCREEN FOR IN SITU ELECTRO-OPTICAL SENSOR WAVEFRONT MEASUREMENT

BACKGROUND OF THE INVENTION

1. Field of the Invention

This invention relates to the assembly and test of electro-optic (EO) sensors on a production line, and more particular to a test system, and method of wavefront measurement.

2. Description of the Related Art

Electro-optics (EO) sensors are configured to image scenes from a point source a long distance away, sufficiently far away that the received electro-magnetic wavefront is typically considered to be planar. EO sensors are: typically used in SWIR, MWIR or LWIR bands but may also operate in the visible band. The EO sensor includes an optical telescope, transmissive or reflective, that is designed to focus an incident electro-magnetic wavefront to an image plane. In a typical scene, the scene is composed of planar wavefronts from multiple point sources. The structure of the scene is imprinted on the composite wavefront as a summation of planar wavefronts with different slopes. The telescope converts these slopes to spatial offsets in the image plane to form an image of the scene. An EO detector is mounted to the optical telescope at or near the image plane to convert the image of the scene to an electronic representation. A video card reads out a temporal sequence of frames from the electronic representation to produce a video signal at an output port. The video signal is provided to other systems such as a guidance module that process images of the scene.

Ideally the optical telescope converts the incident wavefront into a spherical wavefront that collapses onto the image plane of the optical system. Given an ideal point source positioned on the optical axis of the telescope, any deviation from the perfect spherical wavefront (i.e. local slope differences of the wavefront) represents a wavefront error that distorts the image in some way and degrades system performance. Typical sources of error include surface shape defects in the optical telescope itself and mechanical stresses on the optical telescope from mounting the EO detector or other components. It is useful to characterize and understand these deviations in order to both qualify EO sensors during production and to mitigate the sources of error (e.g. improved alignment of telescope components, improved mounting of the EO detector to the telescope and so forth). The wavefront measurement may also be used to directly compensate the errors via a deformable mirror in some applications.

During production of an EO sensor or an assembly including an EO sensor, various tests and calibration procedures are performed at each stage of assembly. Prior to any assembly, the bare optical telescope is tested to compute an initial wavefront estimate. This test is typically performed with an interferometer that superimposes a wavefront under test with a reference wavefront. The difference between these wavefronts creates an interference pattern with a series of fringes that can be mapped to the wavefront error.

The test may also be performed with a Shack-Hartman wavefront sensor that illuminates the entire entrance pupil of the telescope with a collimated beam and uses another optic to image the wavefront onto a lenslet array. The lenslet array spatially separates the wavefront into sub-pupils and focuses the sub-pupils simultaneously onto a detector. Each sub-pupil is focused onto a different sub-region on the detector, and the displacement of each sub-region image with respect to an expected position from a desired wavefront can then be related to the local wavefront error. The extent of each sub-region defines the dynamic range for measuring the local wavefront slope; the greater the spatial resolution the smaller the dynamic range. The different sub-regions of the detector are read out in parallel to provide the local wavefront slope measurements across the entire wavefront simultaneously. The measurements are processed to compute a wavefront estimate. These estimation techniques are described by Harrison H. Barrett et al. "Maximum-likelihood methods in wavefront sensing: stochastic models and likelihood functions" Vol. 24, No. 2/February 2007/J. Opt. Soc. Am. 1 pp. 391-414. Shack-Hartman provides greater dynamic range for measuring local wavefront slopes (error) but less spatial resolution than the interferometer.

The EO detector is then typically mounted onto the telescope near the image plane to form the EO sensor. The EO sensor is subjected to a variety of tests and calibration procedures. If a test reveals a problem e.g. a focus test reveals that the EO sensor's modulation transfer function (MTF) does not meet the specification, the unit is pulled off the production line and retested using the interferometer or Shack-Hartman wavefront sensor. In both cases, a collimated beam that fills the entrance pupil is passed through the telescope and reflected off the EO detector back through the telescope to an external detector. In this double-pass configuration, alignment is critical, hence time-consuming and expensive. Both the hardware and operation of the interferometer and Shack-Hartman wavefront sensor are expensive. Both require an external EO detector as part of the hardware package. Both require an experienced engineer to perform the test.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for wavefront measurement of an EO sensor that is performed in-situ using the sensor's EO detector in a manner that disambiguates the local wavefront measurements for different sub-pupils in time and maximizes the achievable dynamic range of the local wavefront slope measurements.

In an embodiment, a single sub-pupil sized beam is traced over the EO sensor's entrance pupil to serially illuminate a temporal sequence of sub-pupils in a spatial pattern to form a serially addressed "sub-pupil screen". The optical telescope focuses the single sub-pupil beam into a single image at the image plane. An EO detector positioned at or near the image plane and video card capture a video signal of the image for one sub-pupil at a time as the beam traces the spatial pattern. The video signal is routed to a computer processor that generates a spatio-temporal map that maps the spatial positions of the sub-pupils in the sub-pupil screen to the temporal position frames in the video signal. The computer processor uses the map to processes the video signal and compute a wavefront estimate spanning the entrance pupil. The wavefront estimate may be, computed using any number of estimation techniques.

The single sub-pupil sized beam may be traced over the EO sensor's entrance pupil in a variety of ways. In an embodiment, a collimated begin illuminates a pair of disks that are formed with complementary hole patterns. Rotating the disks relative to each other causes only one sub-pupil sized hole in the disks to be aligned at a time to trace the sub-pupil sized collimated beam in a spatial pattern defined by the hole patterns. Peaks in the illumination of the EO detector provide a timing signal for mapping positions of the sub-pupils in the sub-pupil screen to a sub-sampled sequence of frames in the video signal. In another embodiment, sub-pupil sized collimated sources are positioned on concentric circles of increasing radius with respect to an optical axis through the entrance pupil of the EO sensor. The EO sensor is rotated about the optical axis and the sources are activated one at a time in synch with the rotation of the sensor to trace the spatial pattern. The processor estimates the sub-pupil position for each frame to map positions of the sub-pupils in the sub-pupil screen to frames in the video signal. In another embodiment, a single sub-pixel collimated beam may be manually traced over the entrance pupil. In another embodiment, a two-dimensional spatial light modulator may be used to selectively pass a single sub-pupil of a pupil-sized collimated beam through the modulator to trace a single sub-pupil collimated beam over the entrance pupil. The sub-pupil beam need not be collimated, although for many standard EO sensor's, it will be. All that is required is that the sub-pupil beam curvature is known and can be used to compare the resulting image with the current EO sensor in place to an image that would be formed with the desired optical system performance.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 6a and 6b are a drawing of an embodiment of a complementary pair of spinning disks and a time sequence illustrating the tracing of the sub-pupil sized collimated beam;

FIG. 7 is a diagram illustrating an embodiment of a spatio-temporal map from the sub-pupils in the sub-pupil screen to the frames of the video signal for the complementary pair of spinning disks;

FIGS. 9a and 9b are a drawing of an embodiment of the spinning EO sensor and collimated sources and a time sequence illustrating the tracing of the sub-pupil sized collimated beam.

DETAILED DESCRIPTION OF THE INVENTION

Figure 1:
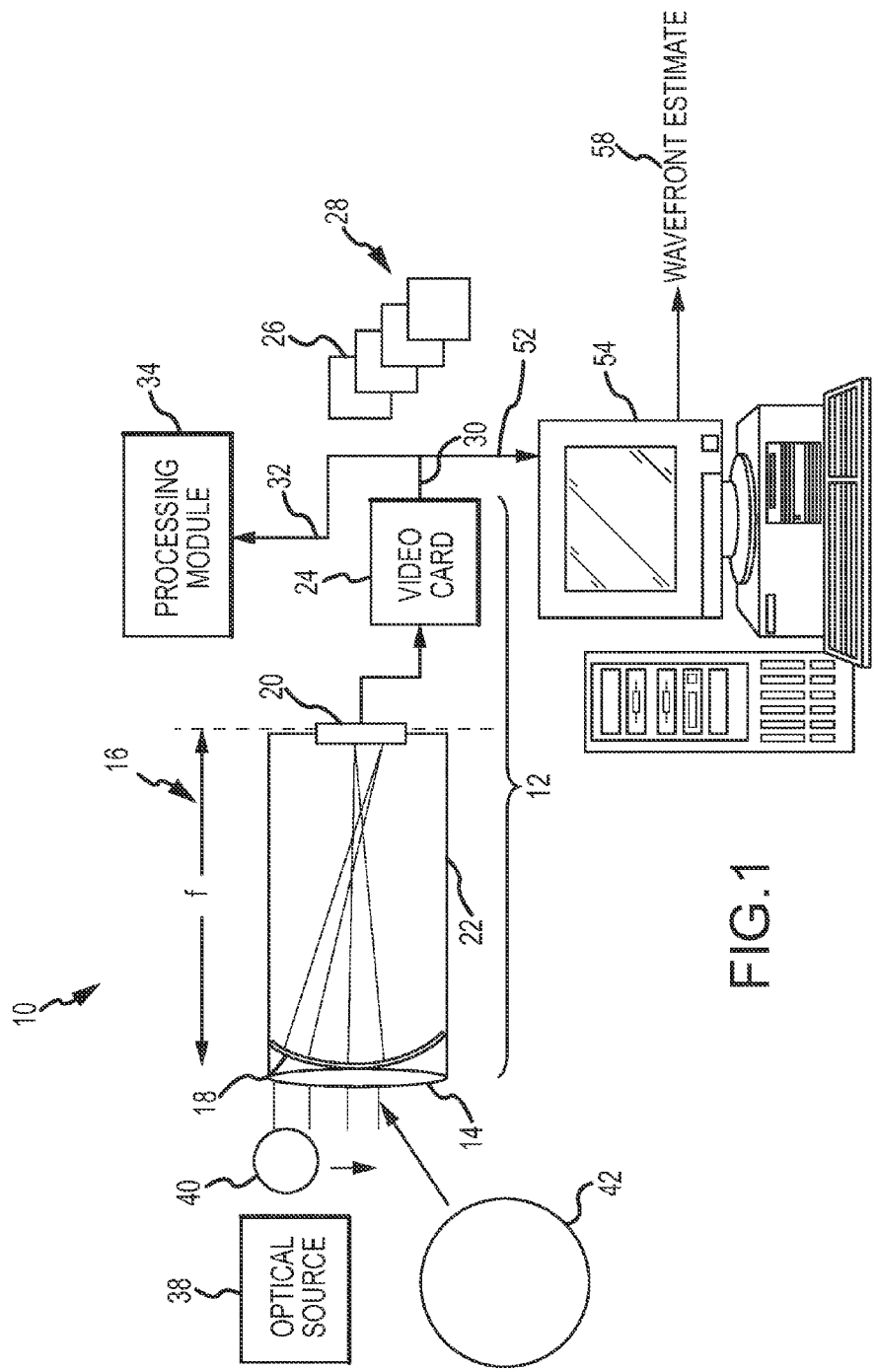
FIG. 1 is a diagram of a test system using a serially addressed sub-pupil screen for in-situ EO sensor wavefront measurement.
Figure 2:
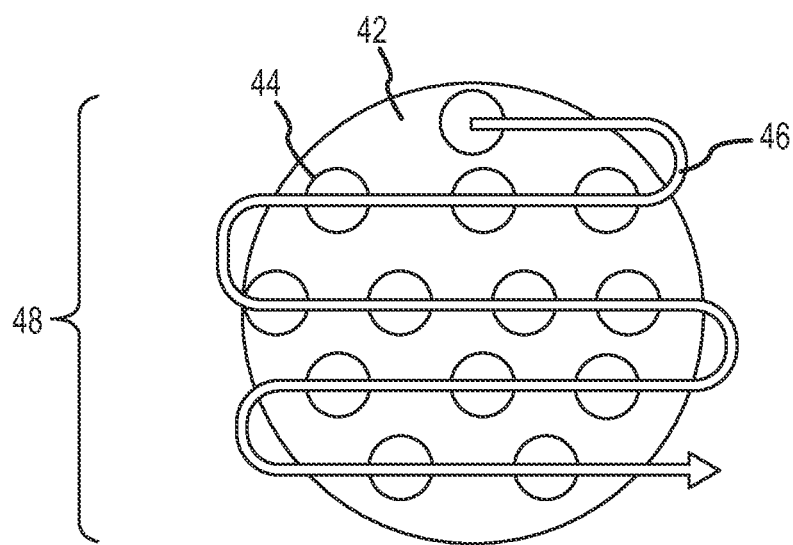
FIG. 2 is a diagram of an embodiment of a serially addressed sub-pupil screen
Figure 3B:
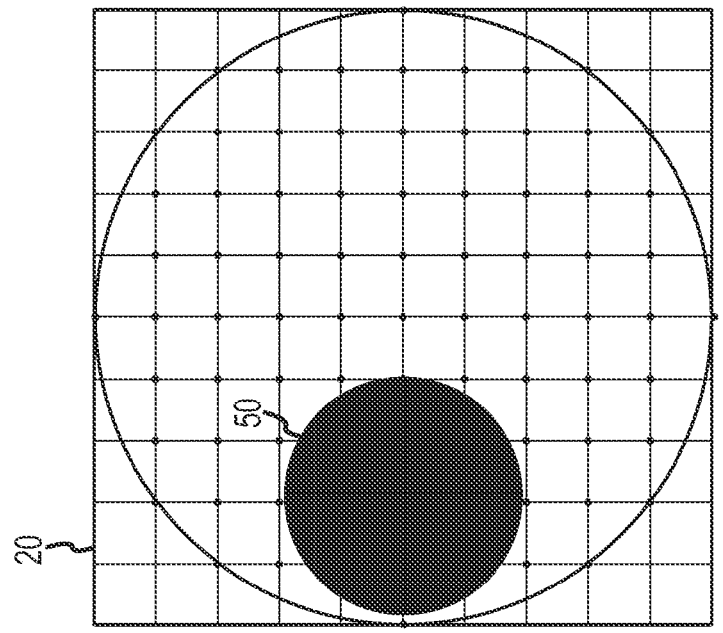
FIGS. 3a and 3b are diagrams of an image of a sub-pupil collimated beam in which mechanical stress on the telescope produces a shift in the centroid of the image proportional to the local slope of the wavefront.
Figure 3A:
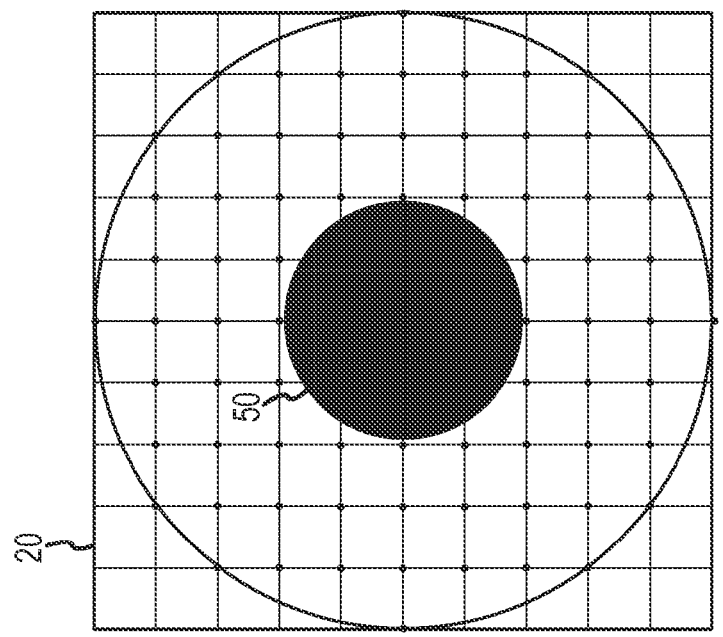

The present invention provides a system and method for wavefront measurement of an EO sensor that is performed in-situ using the sensor's own EO detector. The described approach reduces the time and expense associated with the wavefront measurement by allowing the EO sensor to be tested on the production line. The approach improves the quality of the wavefront estimate by disambiguating each of the sub-pupil measurements and by providing the maximum dynamic range for each local slope measurement for a given EO detector. This effectively decouples the sub-pupil size, hence spatial resolution of the wavefront measurement from the dynamic range for which the wavefront can be measured without ambiguity.

Referring now to FIGS. 1, 2, 3a-3b and 4, an embodiment of a test system 10 provides for in-situ wavefront measurement of an electro-optic (EO) sensor 12 during test and calibration of the EO sensor in the production line. EO sensors are typically used in SWIR, MWIR or LWIR bands but may also operate in the visible band. The EO sensor 12 includes an optical telescope 14, transmissive or reflective, single or multiple element, that is designed to focus an electro-magnetic wavefront to an image plane 16. In general, the image plane 16 is a function of the focal length "f" of the telescope and the distance of the object to the front principal plane of the telescope. The object distance will determine the expected wavefront curvature at the entrance pupil of the system. In the specific and more typical case of an object at an infinite (or very large) distance from the telescope, the object is considered to be "collimated" and the image plane and focal plane of the system are coincident. Ideally, the optical telescope converts the incident wavefront into a spherical wavefront 18 that collapses onto the image plane 16. In a typical scene, the scene is composed of planar wavefronts from multiple point sources at a very large distance from the telescope. The structure of the scene is imprinted on the composite wavefront as a summation of planar wavefronts with different slopes. The telescope converts these different slopes to spatial offsets in the image plane to form an image of the scene.

An EO detector 20 is mounted on the optical telescope by opto-mechanical mounts 22 and positioned at or near the image plane 16 to convert the image of the scene to an electronic representation. If the EO sensor is intended to image objects at a large distance in comparison to the telescope focal length, the image plane and the focal plane are coincident and thus the EO detector is placed not only at the image plane, but also the focal plane of the telescope. The EO detector 20 suitably comprises an x-y array of detector elements that are responsive to illumination in the SWIR, MWIR, LWIR or visible bands. Each detector element measures and outputs the total illumination on that element for a specified sampling or integration period. A video card 24 reads out a temporal sequence of frames 26 from the electronic representation to produce a video signal 28 at an output port 30. During ordinary operation, an internal cable 32 routes the video signal 28 from output port 30 to a processing module 32 such as a guidance module.

The aperture of an optical system such as optical telescope 14 is the physical object (e.g. the primary reflector of the telescope) that limits the bundle of light that propagates through the system from an object on the optical axis (typically the centerline of the optical system, assuming a rotationally symmetric optical system). The entrance pupil is the image of the aperture stop in object space (to the left of the optical telescope 14) and the exit pupil is the image of the stop in image space (to the right of the optical telescope 14). A sub-pupil is a region of the pupil smaller than the entire entrance pupil.

To perform the wavefront measurement, an optical source 38 traces a single sub-pupil sized beam of light 40 in a spatial pattern 46 over the EO sensor's, entrance pupil 42 to serially illuminate a temporal sequence of sub-pupils 44 forming a serially addressed "sub-pupil screen" 48. Typically, the sub-pupil screen exists in collimated space and the screen can be positioned anywhere between the collimated source and the entrance pupil 42. The optical source 38 can emulate any manner of wavefront slope desired, but in most cases it is desired to emulate a planar wavefront with zero slope produced by a single point source. In this case optical source 38 is considered to be collimated. The size of the sub-pupil should be at least ten times the wavelength to avoid diffractive effects and no greater than one-quarter the size of the entrance pupil to provide adequate spatial resolution. More typically for an IR sensor, the sub-pupil will be between $\frac{1}{8}$ and $\frac{1}{16}$ the size of the entrance pupil to adequately resolve the wavefront measurement.

The optical telescope 14 focuses the single sub-pupil beam 40 into a single image 50 (e.g. a spot) at the image plane 16. The beam 40 illuminates a sub-pupil region of the entrance pupil and is mapped to the exit pupil of the system, modified in size by the ratio of the exit pupil and entrance pupil sizes. The sub-pupil of light is then directed from the exit pupil in a direction orthogonal to the wavefront, forming the image 50 of the point source at the image plane of the EO sensor. Any optical errors (e.g. induced by mechanical stress) in the illuminated sub-pupil region of the entrance pupil will produce a shift of the image 50 in the image plane. If the wavefront error can not be accurately estimated by a simple slope change across the sub-pupil, the shape of the image 50 may change as well.

EO detector 20 converts image 50 to an electronic representation. Assuming no errors, each image 50 will be nominally located in the center of EO detector 20. The errors associated with each sub-pupil will produce a different shift e.g. direction or magnitude. Because the size of the sub-pupil is smaller than the entrance pupil, the F-number of the sub-pupil is greater than that of the entrance pupil. A larger F-number means that the central lobe of the diffraction pattern (i.e. image 50) is at least a few pixels wide (e.g. 3 or more) in each direction. Multiple pixels are preferred to get an accurate estimate of the position of the central lobe.

Video card 24 captures the video signal 28 of the image 50 for one sub-pupil at a time as the beam 40 traces the spatial pattern and routes the video signal to a computer processor. In an embodiment, the video signal is routed from output port 30 via an external cable 52 to an external computer 54, where the signal is stored in memory and processed by the computer's processor. In another embodiment, the video signal is routed from output port 30 via internal cable 32 to processing module 34 that executes software to compute the wavefront estimate.

Because the EO detector 20 is positioned at or near the image plane, all of the sub-pupils in the sub-pupil screen are nominally focused to the center of the EO detector. Any shift of image 50 is due solely to errors in the illuminated sub-pupil region of the entrance pupil. Consequently, the frames of the video signal must be mapped to the sub-pupil positions in the sub-pupil screen to compute the wavefront estimate.

Figure 4:
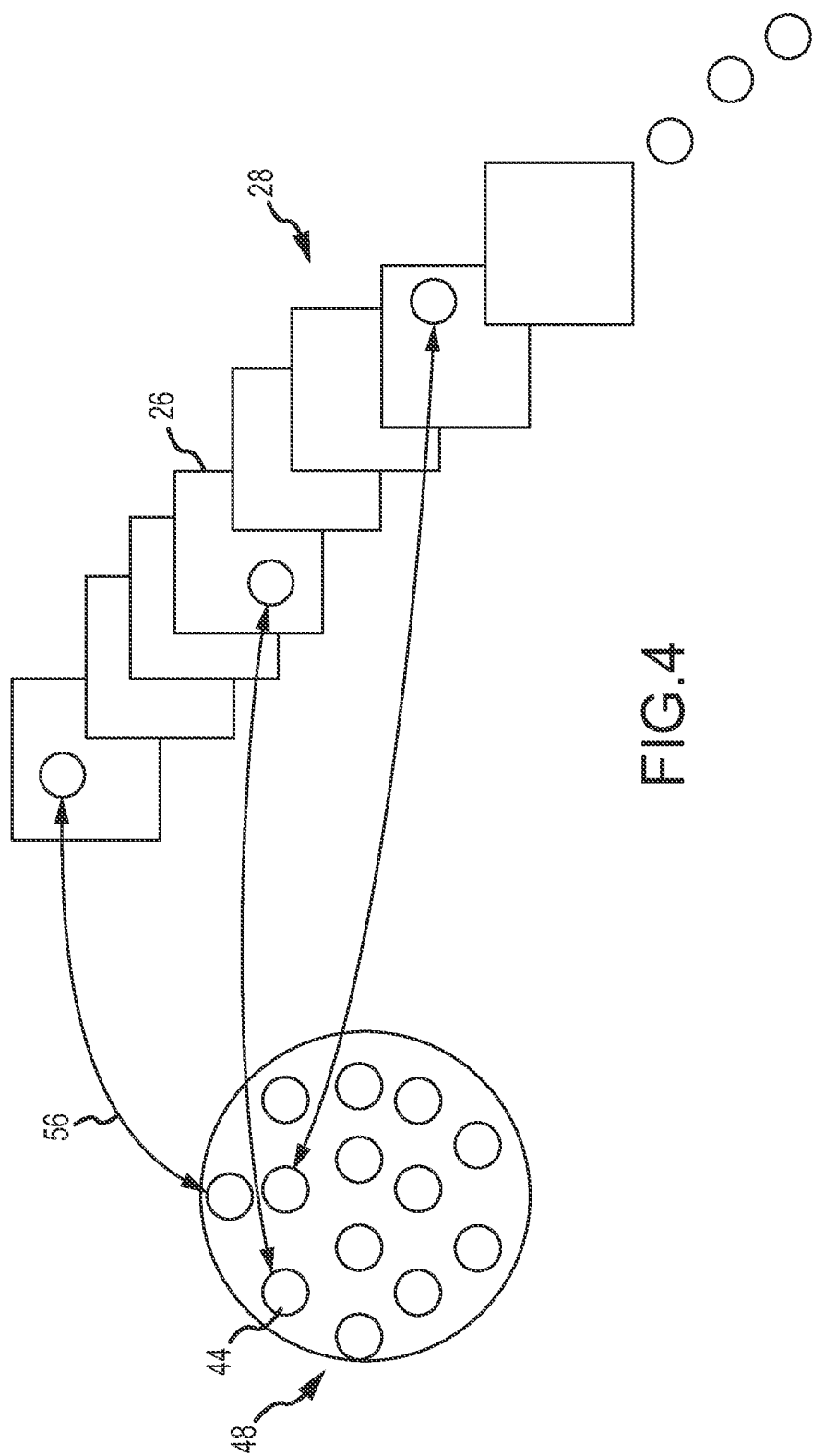
FIG. 4 is a diagram illustrating an embodiment of a spatio-temporal map from the sub-pupils in the sub-pupil screen to the frames of the video signal.

As shown in FIG. 4, the computer processor generates a spatio-temporal mapping 56 that maps the spatial positions of the sub-pupils 44 in the sub-pupil screen 48 to the temporal positions of frames 26 in the video signal 28. Knowing the initial position of the sub-pupil collimated beam, the spatial pattern to be traced and the rate of tracing the pattern, the computer processor can map each sub-pupil 44 to a particular frame 26 (or frames) in the video signal 28. Depending on the optical source used to trace the sub-pupil beam, each sub-pupil 44 may be captured in one and only one frame or a sequence of multiple frames. Some frames may not capture a sub-pupil, or may capture a partial sub-pupil that may be discarded.

Once the frames of the video signal have been mapped to the individual sub-pupils in the sub-pupil screen and stored in memory, the computer processor processes the data to compute a wavefront estimate 58 spanning the entrance pupil. Once the mapping is complete, the processing of the data to compute the wavefront estimate is or can be the same as the backend processing for the Shack-Hartmann wavefront sensor.

The computation of wavefront estimates can follow any number of paths suggested by estimation theory. The general case is to solve an inverse problem to fit a parameterized description of the wavefront to the measured sub-pupil data. A standard method for solving an inverse problem is to create a model of the system under test (typically referred to as a "forward" model), including the parameterized description of the wavefront. The parameters are then varied until the data in the model represents the collected data within the tolerance required for the estimate. There are many such algorithms that will arrive at a suitable answer, one of which is the Maximum Likelihood Estimation Method. The MLE method is preferred by many because it is known to be efficient if an efficient estimator exists (i.e. there is no bias in the estimate and the variance of the estimate has reached the Cramer-Rao lower bound).

To improve the efficiency of computation, the computation of the wavefront estimate can be broken up into pieces; measuring local wavefront slopes for sub-pupils and integrating them to provide the wavefront estimate across the entrance pupil. The local wavefront slopes may be obtained from the relation between the centroid of the imaged sub-pupil beam and the slope of the wavefront. The key is to make the sub-pupil small enough that the characteristics of the wavefront in that region can be estimated via a constant slope. If the wavefront is changing slope rapidly the centroid measurement is no longer necessarily directly related to the characteristics of the wavefront over the sub-pupil. The centroid of each imaged sub-pupil beam is then compared to where it is expected to be if the desired wavefront is incident. If the sub-pupil beam is collimated, the difference in x and y from the desired wavefront is recorded and related to the slope of the wavefront for it's sub-aperture via a simple optics relationship $(x,y)=f(x,y)*\tan(\theta_x,\theta_y)$, where f is the focal length of the optic (in general could be different in x and y), x,y is the centroid and $\theta_x$, $\theta_y$ are the local slopes. The slopes of the wavefront at each sub-pupil are integrated to form an estimate of the wavefront across the pupil.

If desired, an additional step of relating the integrated wavefront to a parameterized version of the wavefront (e.g. a polynomial representation) might be performed at this point. The polynomials often chosen for convenience in optics are referred to as the Zernike polynomials. In order to perform this properly it is important to assume that none of the energy from an image formed at one sub-pupil crosses a boundary into an image for another sub-pupil. If this occurs, there will be errors in the wavefront estimation.

Given that the goal of the data collection and analysis is to determine the wavefront error across the entire pupil based on a sample of data across that pupil, this problem falls into the generic area of mathematics, called estimation theory or inverse problems. In that light, one can see that separating the sub-pupil wavefront measurements in time eliminates the opportunity for cross-contamination of these sub-pupil measurements. Cross-contamination occurs in the Shack-Hartmann configuration as the local wavefront error increases. As this occurs, the individual sub-pupil images begin to merge together, and ultimately a dynamic range limit on the wavefront measurement is reached. In mathematical terms, this means that the Cramer-Rao lower bound on the variance of the estimate is significantly increased when the sub-pupil measurements are ambiguous. By disambiguating the measurements in time, the lower bound on the variance of the estimate is reduced, leading to a large increase in dynamic range.

With reference again to FIGS. 3a and 3b, these figures illustrate certain aspects of the described approach. First, the EO sensor's own EO detector 20 is used to perform the test rather than an additional external detector. This reduces the overall cost of the test system substantially, particularly in the IR bands. Second, only one sub-pupil region of the entrance pupil is illuminated at a given time. This has the desirable effect of disambiguating the measurements of the different sub-pupils in time. The image from one sub-pupil does not interact with the image from another sub-pupil. Third, the entire extent of the EO detector 20 can be used to detect and measure the shift of image 50 for each sub-pupil. This has the desirable effect of maximizing the dynamic range of the measurement for each sub-pupil for a given EO detector. Consequently, the test system can measure larger errors and/or measure the errors with greater resolution. Serially addressing the sub-pupil screen effectively decouples spatial sampling resolution of the wavefront from the magnitude of the wavefront that can be measured without ambiguity.

By comparison, the Shack-Hartman wavefront sensor cannot use the sensor's own EO detector because it requires a lenslet array at the plane of the entrance pupil. The only way to achieve this without altering the system under test is to reimage the pupil with an additional optic onto the Shack-Hartmann lenslet array that is coupled to an additional EO detector. If the errors are large enough, the images may shift far enough to cause ambiguity between measurements for adjacent sub-regions. If energy from one sub-pupil crosses a boundary into a sub-region the detector assigned to a different sub-pupil there will be errors in the wavefront estimation. The extent of each sub-region defines the dynamic range for measuring the error in each sub-pupil. Consequently the dynamic range is reduced by a factor equal to the number of sub-pupils in the pupil. The spatial resolution and dynamic range are directly coupled.

Figure 5:
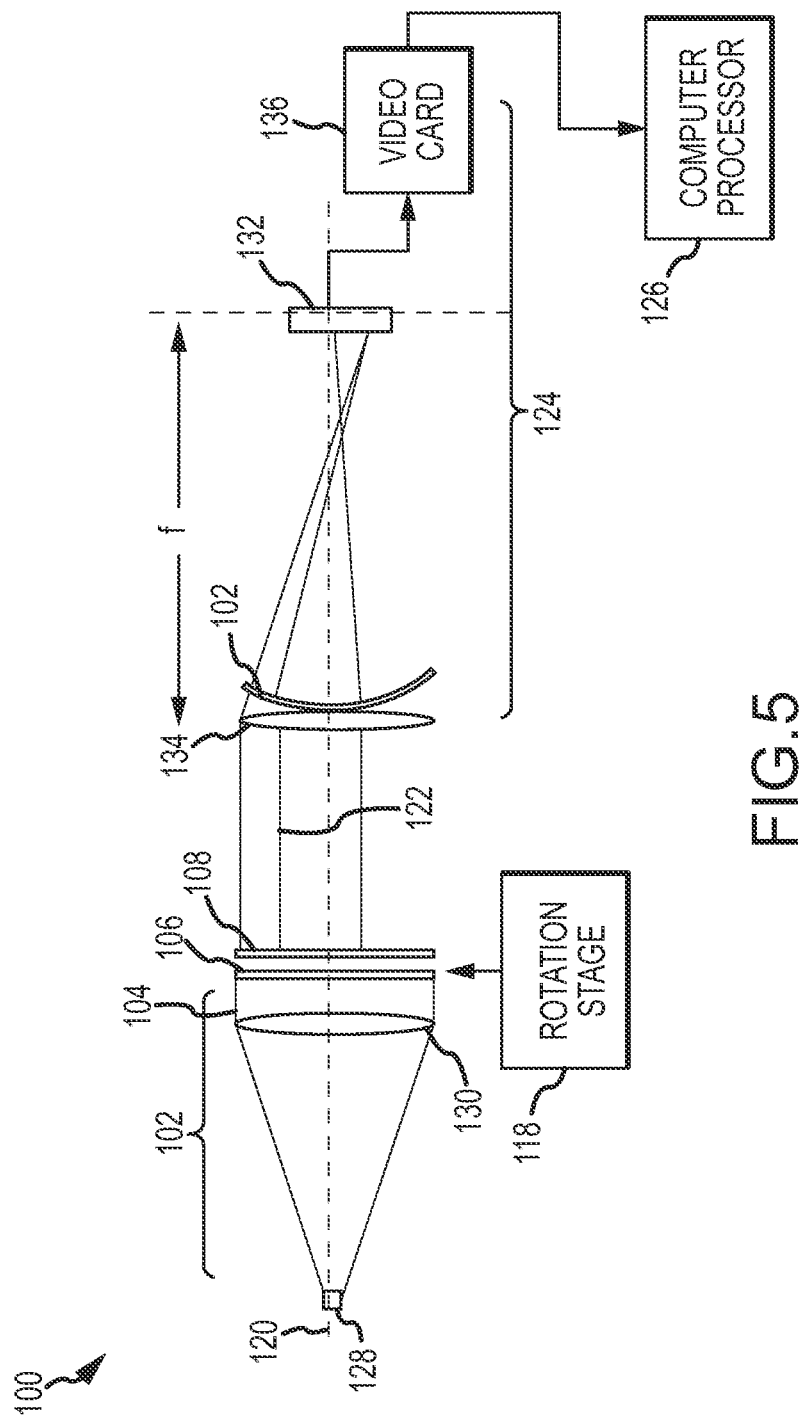
FIG. 5 is a diagram of an embodiment of a test system in which a complementary pair of spinning disks trace a sub-pupil sized collimated beam to form the serially addressed sub-pupil screen.

Referring now to FIGS. 5-7, an embodiment of a test system 100 uses a complementary pair of spinning disks to trace a sub-pupil sized beam over the entrance pupil to serially illuminate sub-pupils. Test system 100 includes a source 102 that projects a beam of light 104, a pair of disks 106 and 108 that have complementary hole patterns 110 and 112, respectively, typically positioned in collimated space, a rotation stage 118 that rotates one of the disks about an axis 120 so that only one hole pair in the disks is aligned at a time to trace a single sub-pupil sized collimated beam 122 in a spatial pattern that spans the entrance pupil of an EO sensor 124 under test, and a computer processor 126 that processes the EO sensor video signal to compute an estimate of the wavefront. Source 102 suitably includes a point source 128 that emits a diverging beam and an optic 130 that directs the light to form the desired beam 104. EO sensor 124 includes an EO detector 132 that is mounted on an optical telescope 134 near the image plane and a video card 136 coupled to the EO detector to generate the video signal.

In an embodiment of disks 106 and 108, hole pattern 110 includes a plurality of holes 140 of the sub-pupil size arranged in the spatial pattern to be traced and hole pattern 112 includes a plurality of holes 142 of the sub-pupil size arranged in a complementary spatial pattern where "complementary" means that rotation of the disks traces a sub-pupil in a spatial pattern given by the hole pattern 110 on the other disk. As shown in FIG. 6a, in an embodiment hole pattern 110 comprises six arms 144 spaced around disk 106 at a first angle offset from the optical axis 120 through the entrance pupil. Each arm 144 includes multiple sub-pupil sized holes 140. Hole pattern 112 comprises a single arm 146 at a second angle in opposition to the first angle offset from the optical axis 120. Arm 146 includes multiple sub-pupil sized holes 142 equal in number to the number of holes in each arm 144. Note, this configuration is designed for a reflective optical telescope in which a center portion 148 of the entrance pupil is not illuminated, hence not characterized. As shown in FIG. 6b, rotation of one of the disks causes one hole pair 150 to be aligned at a time to trace a single sub-pupil sized beam in a spatial pattern dictated by the hole pattern 110 in disk 106.

As shown in FIG. 7, the spinning disks trace the sub-pupil beam to form a serially addressed sub-pupil screen 152 having six arms spaced around the entrance pupil at an angle offset from the optical axis. As previously described, knowing the initial positions of the two disks, the hole patterns of the two disks and the rate of rotation, the computer processor can map each sub-pupil 154 to a particular frame 156 in the video signal 158.

The computer processor may improve the accuracy of this mapping by extracting a timing signal 160 from the video signal 158. As the disks rotate, the single hole pair varies between a state in which the holes are misaligned, perhaps completely, and a state in which the holes are perfect aligned. It follows that the amplitude of total illumination of the EO detector oscillates between a minimum amplitude when the holes in the disks are misaligned and a peak amplitude when the holes in the disks are aligned to form timing signal 160. The peak amplitudes 162 in the timing signal 160 correspond to sub-pupils 154 in the sub-pupil screen 152. Selection of the frames 156 corresponding to the peak amplitudes 162 creates a sub-sampled sequence 164 of frames. For example, every fourth frame (synchronized to the peak amplitudes) may be sub-sampled from the complete video signal. The computer processor can then accurately map the sub-pupils 154 to specific frames 156 in the sub-sampled sequence 164.

Figure 8:
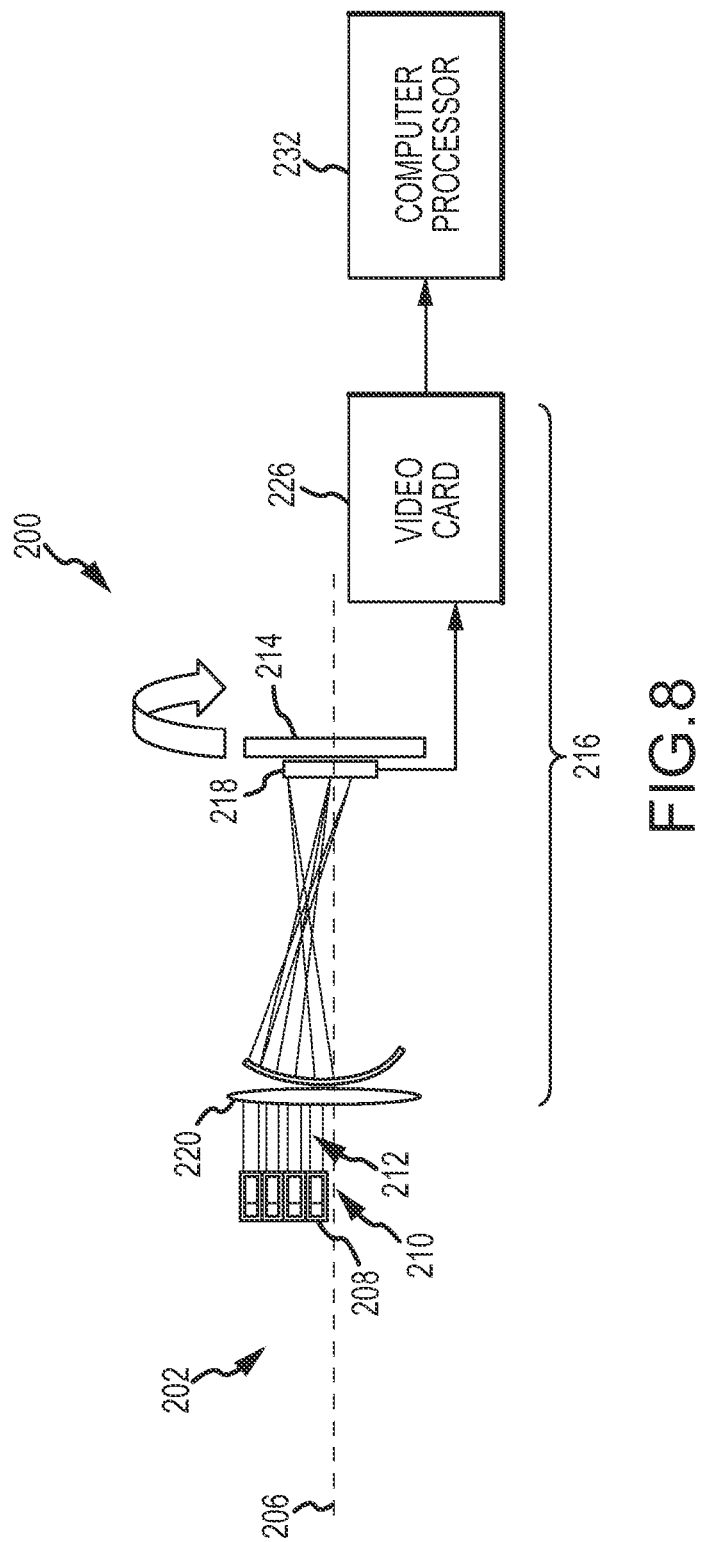
FIG. 8 is a diagram of an embodiment of a test system in which a spinning EO sensor is synchronized to a line of sub-pixel sized collimated beams to trace a sub-pupil sized collimated beam to form the serially addressed sub-pupil screen.
Figure 10:
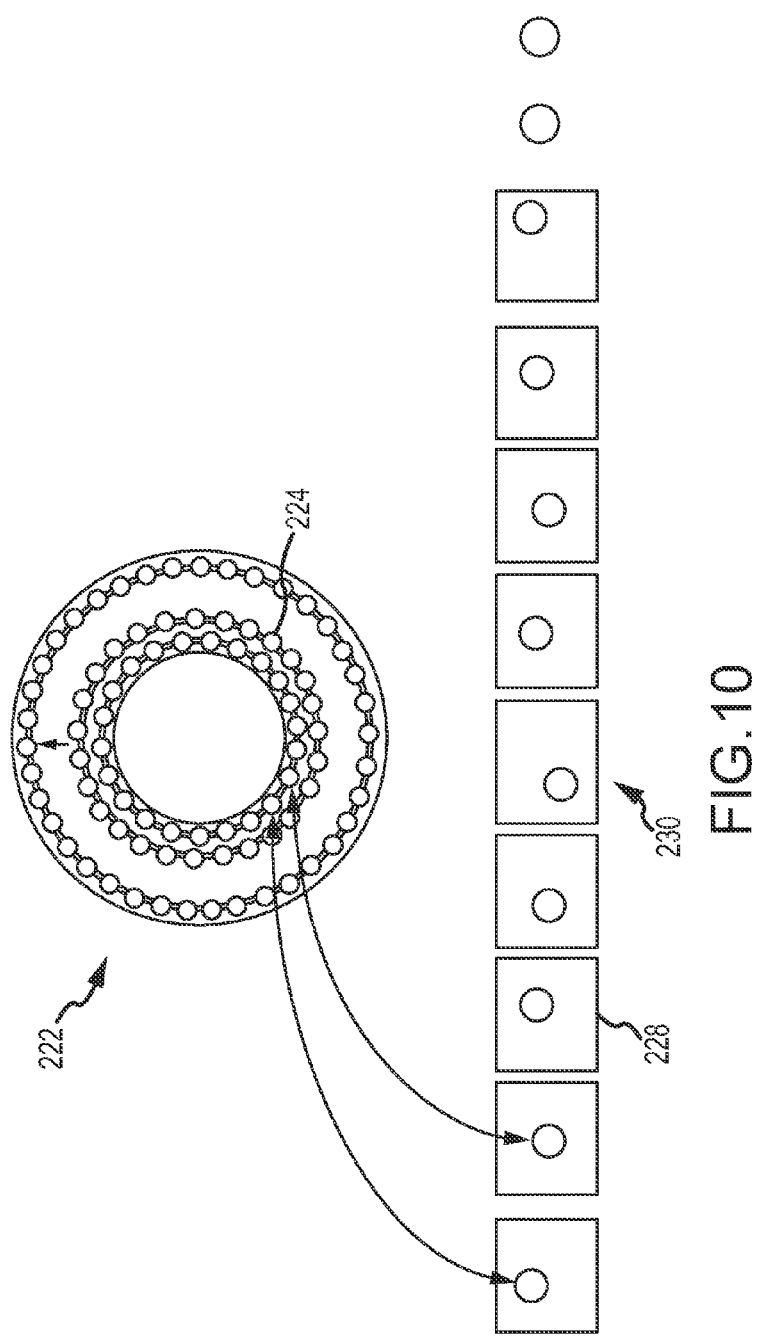
FIG. 10 is a diagram illustrating an embodiment of a spatio-temporal map from the sub-pupils in the sub-pupil screen to the frames, of the video signal for rotating EO sensor.

Referring now to FIGS. 8-10, an embodiment of a test system 200 in which a spinning EO sensor is synchronized to a line of sub-pixel sized optical beams to trace a sub-pupil sized beam over the entrance pupil to serially illuminate sub-pupils. Test system 200 includes a line of sub-pupil sources 202 positioned on concentric circles 204 of increasing radius with respect to an optical axis 206 through the entrance pupil of the EO sensor. Each said source suitably comprises a point source 208 and an optic 210 and can be selectively turned on and off to produce a sub-pupil sized beam of light 212. A rotation stage 214 rotates an EO sensor 216 (an EO detector 218 mounted on an optical telescope 220) about optical axis 206. The sources 208 are turned on one at a time in sync with the rotation of EO sensor 216 to trace only one sub-pupil sized beam 212 in concentric circles 204 that span the entrance pupil to form a serially addressed sub-pupil screen 222 of sub-pupils 224.

EO sensor 216 includes a video card 226 that reads out a temporal sequence of frames 228 from the electronic representation produced by the EO detector to produce a video signal 230. Knowing the positions of the sources, the activation sequence of the sources and rate of rotation of the EO sensor, a computer processor 232 estimates the sub-pupil position for each frame to generate a spatio-temporal mapping of spatial positions of the sub-pupils 224 in the sub-pupil screen 222 to temporal positions of frames 228 in the video signal 230.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of in-situ wavefront measurement of an electro-optic (EO) sensor during test and calibration of the EO sensor in the production line, comprising:
   mounting the EO sensor in a test fixture, said EO sensor including an optical telescope having an entrance pupil for receiving an electro-magnetic wavefront and focusing the wavefront to an image plane, an EO detector positioned near the image plane to convert an image of a scene to an electronic representation, a video card that reads out a temporal sequence of frames from the electronic representation to produce a video signal at an output port, and an opto-mechanical mount that mounts the EO detector to the telescope;
   tracing a single sub-pupil sized optical beam in a spatial pattern over the entrance pupil to serially illuminate a temporal sequence of sub-pupils, said EO sensor's optical telescope focusing the beam into an image on the EO detector, said EO detector and video card capturing a video signal of the image for one sub-pupil at a time as the beam traces the spatial pattern;
   routing the video signal from the output port to a computer processor; and
   with said computer processor computing a spatio-temporal mapping of the positions of the sub-pupils in the spatial pattern to the temporal positions of frames in the video signal and using the mapping to compute a wavefront estimate spanning the entrance pupil.

2. The method of claim 1, wherein producing the video signal of the image of the optical beam for one sub-pupil at a time disambiguates local wavefront measurements for different sub-pupils in time and maximizes the dynamic range for measuring the local wavefront by imaging the beam for one sub-pupil to the entire EO detector.

3. The method of claim 1, wherein the EO detector is responsive to a band of electromagnetic energy in the SWIR, MWIR or LWIR bands.

4. The method of claim 1, wherein the EO detector comprises an x-y array of detector elements, wherein a central lobe of the image of the sub-pupil optical beam spans at least three detector elements in each of the x and y directions.

5. The method of claim 4, wherein the size of the sub-pupil sized optical beam is no greater than one-fourth the size of the entrance pupil.

6. The method of claim 1, wherein the computer professor processes the frames to compute a centroid of the image of the sub-pupil optical beam and from the centroid a local slope for each sub-pupil and integrates the local slopes to compute the wavefront estimate.

7. The method of claim 1, wherein the sub-pupil optical beam is traced in the spatial pattern by,
   emitting a divergent beam from a blackbody source;
   passing the divergent beam through a collimating telescope that produces a source collimated beam that spans the entrance pupil;
   providing a first disk, said disk formed with a plurality of holes of the sub-pupil size arranged in the spatial pattern;
   providing a second disk, said disk formed with a plurality of holes of the sub-pupil size arranged in a complementary spatial pattern; and
   rotating the second disk relative to the first disk so that only one hole in the second disk is aligned to only one hole in the first disk at a time and illuminated by the source collimated beam to trace the single sub-pupil optical beam in the spatial pattern.

8. The method of claim 7, further comprising:
   measuring an amplitude, of the illumination of the EO detector that oscillates between a minimum amplitude when the holes in the first and second disks are misaligned and a peak amplitude when the holes in the first and second disks are aligned to provide a timing signal,
   said processor using the peak amplitudes of the timing signal to create a sub-sampled sequence of frames and mapping the positions of the sub-pupils in the spatial pattern to the sub-sampled sequence of frames.

9. The method of claim 8, wherein the computer processor processes the frame of the video signal corresponding to the peak amplitude to compute a centroid of the image of the collimated beam and a local slope for each sub-pupil and integrates the local slopes to compute the wavefront estimate.

10. The method of claim 7, wherein the spatial pattern comprises multiple arms spaced around the first disk at a first angle offset from an optical axis through the entrance pupil, each said arm including multiple sub-pupil sized holes, and wherein said complementary spatial pattern comprises a single arm at a second angle in opposition to the first angle offset from the optical axis.

11. The method of claim 1, wherein the sub-pupil optical beam is traced in the spatial pattern by,
   providing a line of sub-pupil collimated sources positioned on concentric circles of increasing radius with respect to an optical axis through the entrance pupil of the EO sensor, each said collimated source configured to produce a sub-pupil sized collimated spot;
   rotating the EO sensor about the optical axis; and
   enabling the collimated sources one at, a time in synch with the rotation of the EO sensor to trace only one sub-pupil sized collimated beam in concentric circles in the spatial pattern.

12. The method of claim 11, wherein the computer processor estimates the sub-pupil position for each frame of the video signal to generate the spatio-temporal mapping.

13. The method of claim 12, wherein the computer processor processes each frame of the video signal to compute a centroid of the image of the collimated beam and a local slope for each sub-pupil and integrates the local slopes to produce the wavefront measurement.

14. The method of claim 1, wherein the video signal is routed to an external computer in which the computer processor resides.

15. A method of in-situ wavefront measurement of an electro-optic (EO) sensor during test and calibration of the EO sensor in the production line, comprising:

mounting the EO sensor in a test fixture, said EO sensor including an optical telescope having an entrance pupil for receiving an electro-magnetic wavefront and focusing the wavefront to an image plane, an EO detector comprising an x-y array of detector elements positioned near the image plane to convert an image of a scene in an IR band to an electronic representation, a video card that reads out a temporal sequence of frames from the electronic representation to produce a video signal at an output port, and an opto-mechanical mount that mounts the EO detector to the telescope;

tracing a single sub-pupil sized optical beam no greater than one-fourth the size of the entrance pupil in a spatial pattern over the entrance pupil to serially illuminate a temporal sequence of sub-pupils to form a sub-pupil screen that spans the entrance pupil, said EO sensor's optical telescope focusing the optical beam into an image on the EO detector, said image having a central lobe that spans at least three detector elements in each of the x and y directions, said EO detector and video card capturing a video signal of the image for one sub-pupil at a time as the beam traces the spatial pattern;

routing the video signal from the output port to a computer processor; and with said computer processor computing a spatio-temporal mapping of the spatial positions of the sub-pupils in the sub-pupil screen to the temporal positions of frames in the video signal for computing a wavefront estimate.

16. A test system for in-situ wavefront measurement of an electro-optic (EO) sensor during test and calibration of the EO sensor in the production line, comprising:

a test fixture for mounting the EO sensor, said EO sensor including an optical telescope having an entrance pupil for receiving an electro-magnetic wavefront and focusing the wavefront to an image plane, an EO detector positioned near the image plane to convert an image of a scene to an electronic representation, a video card that reads out a temporal sequence of images from the electronic representation to produce a video signal at an output port, and an opto-mechanical mount that mounts the EO detector to the telescope;

an optical source that traces a single sub-pupil sized optical beam in a spatial pattern over the entrance pupil to serially illuminate a temporal sequence of sub-pupils, said EO sensor's optical telescope focusing the optical beam into an image on the EO detector, said EO detector and video card capturing a video signal of the image for one sub-pupil at a time as the beam traces the spatial pattern;

an external computer having memory and a computer processor; and an external cable connecting the EO sensor's video card output port to the external computer to store the video signal in said memory, said computer processor generating a spatio-temporal mapping of the positions of the sub-pupils in the spatial pattern to the temporal positions of the frames in the video signal and processing the video signal to compute a wavefront estimate spanning the entrance pupil, said serial illumination disambiguating local wavefront measurements of the wavefront in time and maximizing the dynamic range for measuring the local wavefronts.

17. The test system of claim 16, wherein the EO detector comprises an x-y array of detector elements, wherein the sub-pupil sized optical beam is no greater than one-fourth the size of the entrance pupil so that a central lobe of the image of the beam spans at least three detector elements in each of the x and y directions.

18. The test system of claim 16, wherein the optical source comprises:

a blackbody source that emits a divergent beam;

a collimating telescope that collimates the divergent beam to produce a source collimated beam that spans the entrance pupil;

a first disk formed with a plurality of holes of the sub-pupil size arranged in the spatial pattern;

a second disk formed with a plurality of holes of the sub-pupil size arranged in a complementary spatial pattern; and a rotation stage that rotates the second disk relative to the first disk so that only one hole in the second disk is aligned to only one hole in the first disk at a time and illuminated by the source collimated beam to trace the single sub-pupil sized optical beam in the spatial pattern.

19. The test system 18, wherein said processor measures an amplitude of illumination of the EO detector that oscillates between a minimum amplitude when the holes in the first and second disks are misaligned and a peak amplitude when the holes in the first and second disks are aligned to provide a timing signal, said processor using the peak amplitudes of the timing signal to create a sub-sampled sequence of frames and mapping the positions of the sub-pupils in the spatial pattern to the sub-sampled sequence of frames.

20. The test system of claim 16, wherein the optical source comprises a line of sub-pupil collimated sources positioned on concentric circles of increasing radius with respect to a longitudinal axis through the entrance pupil of the EO sensor, each said collimated source configured to produce a sub-pupil sized collimated spot, further comprising:

a rotation stage for rotating the EO sensor about the longitudinal axis; and a controller for synchronously enabling the collimated sources one at a time with the rotation of the EO sensor to trace only one sub-pupil sized optical beam in concentric circles to form the spatial pattern.

* * * * *